E. FARR.
TIRE ARMOR.
APPLICATION FILED APR. 14, 1915.
1,163,518.  Patented Dec. 7, 1915.
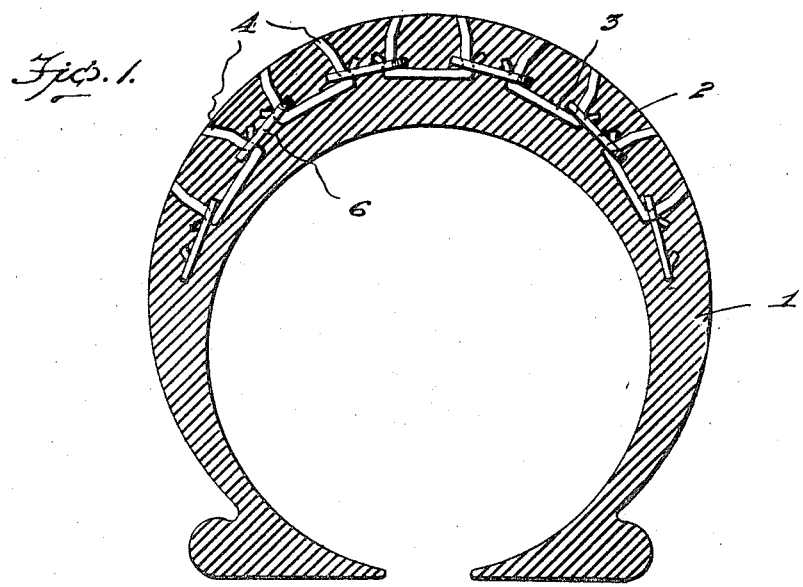
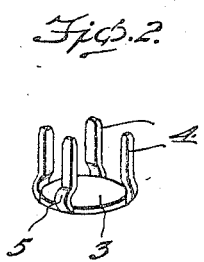
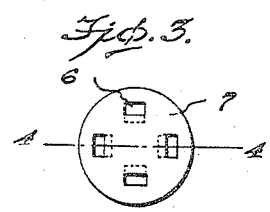
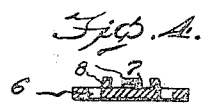
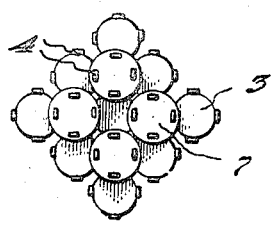
Inventor
E. Farr.

UNITED STATES PATENT OFFICE.

EDWARD FARR, OF LANCASTER, OHIO.

TIRE-ARMOR.

1,163,518. Specification of Letters Patent. Patented Dec. 7, 1915.

Application filed April 14, 1915. Serial No. 21,389.

*To all whom it may concern:*

Be it known that I, EDWARD FARR, a citizen of the United States, residing at Lancaster, in the county of Fairfield and State of Ohio, have invented certain new and useful Improvements in Tire-Armor; and I do hereby declare the following to be a full, clear, and exact description of the invention, such as will enable others skilled in the art to which it appertains to make and use the same.

This invention relates to tire armors, and the primary object of the invention is to provide an armor for insertion into the tread sections of pneumatic or solid rubber tires, used upon various types of vehicles, such as motor vehicles or the like, and the primary object of the invention is to provide a tire armor as specified which will materially increase the longevity of the tire, and prevent skidding of the tire upon a smooth or slick surface.

Another object of this invention is to provide a tire armor as specified, which is embedded in the tread section of the tire and includes a link armor composed of disks, certain of said disks being provided with upstanding prongs, which are inserted through openings formed in other disks, for forming a flexible substantially punctureproof armor for the tire.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which—

Figure 1 is a cross sectional view through the shoe of a pneumatic tire, Fig. 2 is a perspective view of the disk which carries the prongs, Fig. 3 is a plan view of the connecting or coupling disks, Fig. 4 is a sectional view on the line 4—4 of Fig. 3, and Fig. 5 is a plan view of a section of the armor assembled.

Referring more particularly to the drawings, 1 designates the shoe of an ordinary pneumatic tire, but it is to be understood that this invention may be applied to any suitable type of rubber, resilient or pneumatic tire which is used upon various types of vehicles, without departing from the spirit of the invention.

The armor 2 is composed of plates 3, which have a plurality of prongs 4 secured thereto and extending upwardly substantially at right angles to the body of the plates or disks 3. The prongs 4 are curved, immediately above their junction with the disks, as is shown at 5, for receiving the edges of the openings 6 which are formed in the connecting disks 7. The connecting disks 7 are provided with a plurality of openings 6, corresponding to the number of prongs 4 formed upon the disks 3. The openings 6 are formed by punching the disks 7, which forms projections 8, which extend outwardly from one face of the disks 7.

When assembling the armor, the prongs 4 of the disks 3 are inserted through certain openings in the connecting disks 7, forming a flexible chain or linked armor, as illustrated in Fig. 5 of the drawings, which is embedded in the tread section of the tire or tire shoe, having the ends of the prongs lying flush with the outer surface of the tread section of the tire or tire shoe, as is clearly shown in Fig. 1 of the drawings. The ends of the prongs 4 prevent skidding of the wheel, upon which the tire is mounted, and the disks 3 and the connecting disks 7, being connected as is shown in Fig. 5, form a protective armor, which will substantially prevent or eliminate puncturing of the tire through the tread section thereof. The metallic reinforcing of the tire, by means of the armor heretofore described, will materially increase the longevity of the tire as well as protect the same.

In reducing the invention to practice, certain minor features of construction, combination and arrangement of parts may necessitate alterations to which the patentee is entitled, provided such alterations are comprehended within the scope of what is claimed.

What is claimed is:—

1. The combination with a pneumatic tire for vehicles, of a tire armor embedded in the tread section of the tire and including a plurality of disks, prongs formed upon and extending transversely from said disks to the outer surface of the tire, and connecting links engaging said prongs for connecting the disks to form a flexible armor.

2. The combination with a pneumatic tire for vehicles, of an armor embedded in the tread section of the tire including a plurality of disks, spaced prongs formed upon and extending transversely from said disks to the outer surface of the tread section of said tire, a plurality of connecting disks provided with openings for receiving said prongs for connecting said first named disks, for forming a flexible protective armor.

3. The combination with a pneumatic tire for vehicles, of an armor embedded in the tread section of the tire including a plurality of disks, spaced prongs formed upon and extending transversely from said disks to the outer surface of the tread section of said tire, a plurality of connecting disks provided with openings receiving said prongs for connecting said first named disks for forming a flexible protective armor, said prongs being curved outwardly adjacent to their connection with the disks for preventing accidental displacement of said connecting disks.

In testimony whereof I affix my signature in presence of two witnesses.

EDWARD FARR.

Witnesses:
C. C. PICKERING,
C. L. BERRY.